L. C. BIGBIE.
SWINGLETREE.
APPLICATION FILED AUG. 13, 1913.

1,114,099.

Patented Oct. 20, 1914.

Witnesses

Inventor
L. C. Bigbie.
By
Attorney

UNITED STATES PATENT OFFICE.

LOUIS C. BIGBIE, OF EDISON, GEORGIA.

SWINGLETREE.

1,114,099.   Specification of Letters Patent.   Patented Oct. 20, 1914.

Application filed August 13, 1913. Serial No. 784,648.

*To all whom it may concern:*

Be it known that I, LOUIS C. BIGBIE, a citizen of the United States, residing at Edison, in the county of Calhoun and State of Georgia, have invented certain new and useful Improvements in Swingletrees; and I do hereby declare the following to be a full, clear, and exact description of the invention, such as will enable others skilled in the art to which it appertains to make and use the same.

This invention relates to new and useful improvements in swingle trees and has for its object the provision of a swingle tree which will be extensible.

Another object of my invention is the provision of a device of the above character which may be adjusted and is provided with a clevis to permit the same to remain in its adjusted position.

Figure 1:
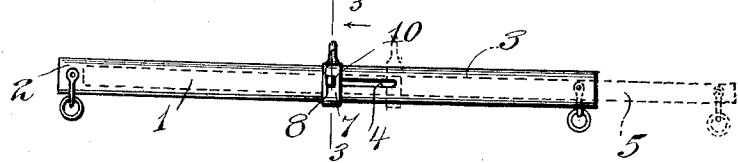
Figure 2:
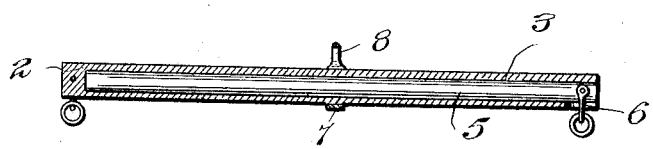
Figure 3:
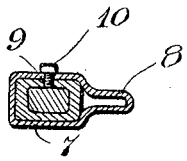

With the above and other objects in view I now proceed to describe my invention in the following specification and accompanying drawings, in which, Figure 1 is a top plan view of my improved swingle tree showing the same extended in the dotted position, Fig. 2 is a longitudinal horizontal sectional view of my improved swingle tree, and Fig. 3 is a transverse sectional view taken on line 3—3 of Fig. 1.

Referring to the drawings by characters of reference 1 indicates a tubular member forming a part of my improved swingle tree, having a closed end, as shown at 2. This member 1 is provided at the end opposite the closed end 2 with a suitable cut-away portion, as indicated, which forms a slot 3 as will be clearly seen upon referring to the drawing. A second slot 4 is formed at right angles to the first mentioned slot and is adapted to permit the clevis to be adjusted with relation to the member 1. A suitable plunger 5 is adapted to fit the interior of the tubular member.

Secured to the end of the plunger and to the end of the tubular member opposite its open end I preferably provide the usual trace attaching means which is indicated by the numeral 6. These trace hooks are of the ordinary construction and comprise the loops having rings secured therein. Intermediate the ends of the tubular member and surrounding the same I preferably provide the band 7 which is formed of a single piece of material and is extended rearwardly, as shown at 8, to provide means by which the swingle tree is adapted to be attached to the remainder of the draft mechanism of a vehicle. A suitable aperture 9 is provided in the upper side of the band 7 and is adapted to receive the bolt 10 by means of which the band is held in place on the swingle tree.

It will be clearly seen from the foregoing that when it is desired to extend my improved swingle tree the bolt 10 is loosened and the plunger extended to the desired point. The band 7 is then adjusted to the proper relation with the extended swingle tree and the bolt again tightened. It will be obvious that the bolt 10 will hold the swingle tree in its adjusted position as the inner end of the shank of the bolt extends through the slot in the tubular member and engages the plunger, thereby securely holding all parts and eliminating accidental movement of the device.

While in the foregoing I have shown and described the preferred embodiment of my invention, I wish it to be understood that I may change the specific arrangement of parts without in any way departing from the spirit and scope of my invention.

What I claim is:—

A device of the character described, comprising a tubular body portion, a closure at one end of said tubular body portion, the opposite end of said tubular body portion being provided with a slot, said tubular body portion being provided with a centrally located longitudinally extending slot, each of said slots communicating with the interior of the body portion, a trace securing ring secured to the closed end of the tubular body portion, an extension slidable in the tubular body portion, a trace securing ring secured to one end of the extension and adapted to be held in the slotted end of the body portion, a ring encircling the tubular body portion, said ring being provided with an internally screw threaded aperture, a set screw adapted to extend through the aperture and through the slot in the tubular body portion so that its free end will engage the slidable extension, and means carried by the ring to secure the same to a whiffletree.

In testimony whereof I affix my signature in presence of two witnesses.

LOUIS C. BIGBIE.

Witnesses:
J. G. LUMLEY,
L. C. MANRY.